(12) United States Patent
McKelvie et al.

(10) Patent No.: US 9,723,064 B1
(45) Date of Patent: Aug. 1, 2017

(54) HYBRID QUORUM POLICIES FOR DURABLE CONSENSUS IN DISTRIBUTED SYSTEMS

(71) Applicant: Amazon Technologies, Inc., Reno, NV (US)

(72) Inventors: Samuel James McKelvie, Seattle, WA (US); Anurag Windlass Gupta, Atherton, CA (US); Pradeep Jnana Madhavarapu, Mountain View, CA (US); James McClellan Corey, Bothell, WA (US); Yan Valerie Leshinsky, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 148 days.

(21) Appl. No.: 14/475,200

(22) Filed: Sep. 2, 2014

(51) Int. Cl.
*H04L 29/08* (2006.01)
*H04L 29/06* (2006.01)

(52) U.S. Cl.
CPC .............. *H04L 67/10* (2013.01); *H04L 67/42* (2013.01)

(58) Field of Classification Search
CPC ................................ H04L 67/10; H04L 67/42
USPC ......................................................... 709/203
See application file for complete search history.

(56) References Cited

U.S. PATENT DOCUMENTS

| | | | |
|---|---|---|---|
| 5,948,109 A | 9/1999 | Moiin et al. | |
| 6,938,084 B2 | 8/2005 | Gamache et al. | |
| 7,016,946 B2 | 3/2006 | Shirriff | |
| 7,191,357 B2 | 3/2007 | Holland et al. | |
| 7,552,321 B2 | 6/2009 | Rockwood et al. | |
| 7,613,774 B1 * | 11/2009 | Caronni | H04L 67/104 709/205 |
| 7,827,441 B1 * | 11/2010 | Wenzel | G06F 11/1076 711/130 |
| 8,578,204 B1 * | 11/2013 | Ortenberg | G06F 11/1425 714/2 |
| 2003/0023680 A1 * | 1/2003 | Shirriff | G06F 11/0709 709/204 |
| 2004/0078654 A1 * | 4/2004 | Holland | G06F 17/30607 714/13 |

(Continued)

OTHER PUBLICATIONS

Dual-Quorum: A highly available and consistent replication system for edge services vol. 7 No. 2 IEEE, 2010.*

(Continued)

*Primary Examiner* — Brian J Gillis
*Assistant Examiner* — Steve Lin
(74) *Attorney, Agent, or Firm* — Robert C. Kowert; Meyertons, Hood, Kivlin, Kowert & Goetzel, P.C.

(57) ABSTRACT

Hybrid quorum policies may be implemented for access requests to state maintained in a distributed system. An update to state maintained in a distributed system may be sent to multiple nodes in the distributed system maintain the state in order to satisfy a hybrid quorum policy for updating the state in the distributed system. The hybrid quorum policy may include individual quorum policies for multiple quorum sets including nodes of the distributed system. Acknowledgments received from nodes in the distributed system indicating that the update is performed may be evaluated according to the individual quorum policies to determine whether the hybrid quorum policy is satisfied. If the hybrid quorum policy is satisfied, then the update to the state may be considered durable.

20 Claims, 9 Drawing Sheets

(56) References Cited

U.S. PATENT DOCUMENTS

| | | | |
|---|---|---|---|
| 2007/0156842 A1* | 7/2007 | Vermeulen | G06F 17/30212 709/217 |
| 2010/0205273 A1* | 8/2010 | Shim | G06F 11/1425 709/210 |
| 2012/0197822 A1* | 8/2012 | Lee | G06F 9/5061 706/10 |

OTHER PUBLICATIONS

L. Gao, M. Dahlin, J. Zheng, L. Alvisi, A. Iyengar, Dual-Quorum: A Highly Available and Consistent Replication System for Edge Services, IEEE Transactions on Dependable and Secure Computing, Published by the IEEE Computer Society, 2008, pp. 1-35.

* cited by examiner

HYBRID QUORUM POLICIES FOR DURABLE CONSENSUS IN DISTRIBUTED SYSTEMS

BACKGROUND

Distributed systems have created great opportunities for implementing more efficient and available system architectures. Systems may no longer be limited by the capabilities of an individual computing system, but may instead share the workload for performing complex computing tasks, maintaining and storing data, or implementing various applications or services among multiple different computer systems. For example, in some distributed systems respective replicas or versions of data may be maintained among a collection of different systems in order to provide greater reliability and availability in the face of individual system failures.

The ability to leverage the capabilities of multiple different systems, however, can increase the complexity of ensuring that common data or other information maintained or shared among multiple systems is consistent. If, as in the previous example, different replicas of data are maintained in multiple locations, a change to the data may precipitate respective changes to the various replicas of the data maintained at the multiple different systems. As distributed systems are subject to a wide variety of failure scenarios, consistency schemes to account for these failure scenarios when making changes to common data or other information maintained or shared may prove challenging to design or implement.

Figure 1A:
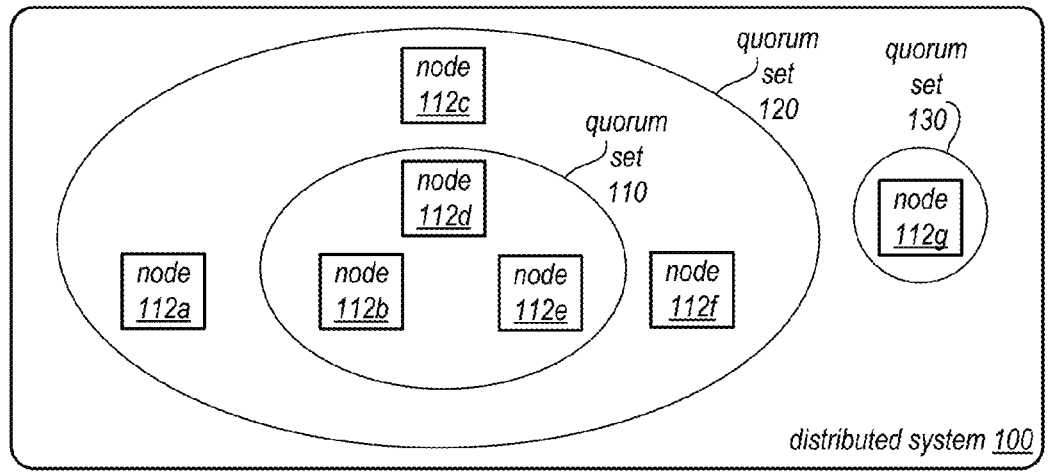
FIGS. 1A-1E are block diagrams illustrating hybrid quorum policies for updating and reading state maintained in distributed system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of implementing a hybrid quorum policy for durable consensus in a distributed system are described herein. Achieving durable consensus for changes made to the state of (or the state maintained in) a distributed system often relies on a quorum policy for a quorum set. A quorum set may include the various systems, devices, components, and/or nodes that make up the distributed system maintaining the state. A quorum policy may describe the number of nodes in a distributed system for establishing a quorum for updating or reading state maintained in the distributed system. A quorum policy, for example, may be implemented to require successful acknowledgements of write requests to data from at least 4/6 replicas of a database table, record, or file spread among different nodes. When reading the database table, record, or file, a corresponding quorum policy for reading may be implemented to require response from at least 3/6 replicas.

While a quorum policy for a quorum set of a distributed system can achieve consensus for state maintained in a distributed system, the participant nodes in the quorum set are treated as homogenous. Distributed system architectures, however, may utilize diverse or heterogeneous systems, components, devices, or nodes for maintaining state. Performance characteristics, failure characteristics or any other capability or configuration of participant nodes in a distributed system may not be effectively accounted for within a single quorum policy and/or quorum set. For example, in a distributed storage system, different storage nodes may implement different storage devices to store a replicated set of data. Some storage nodes may utilize solid state drives, for instance, which may provide lower latency when responding to access requests, whereas other storage nodes in the distributed system may implement higher latency spinning media storage devices. In another example, different groups of nodes within a distributed system may be subject to different failure characteristics (e.g., groups of nodes are implemented using different power or network resources which may cause correlated failures for those nodes within a particular group). In various embodiments, a hybrid quorum policy may account for and/or optimize based on these different performance characteristics, failure characteristics, or other distributed system configurations or capabilities.

FIG. 1A is a logical block diagram illustrating an example distributed system, according to some embodiments, for which a hybrid quorum policy may be implemented. For example, nodes 112a, 112b, 112c, 112d, 112e, 112f, and 112g may maintain a state as part of distributed system 100. Nodes 112 may the same or different type of servers, systems, components, or devices, such as computing system 1000 described below with regard to FIG. 9, which may maintain replicas or versions of the state. State may be, in various embodiments, any data item, set, volume, collection, table or other information. State may also be the configuration of nodes 112, the state of distributed system 100, or any other information for which consensus may be needed. For example, the state of distributed system 100 may include determining whether the various nodes in distributed system 100 or another system, component or device reliant upon the state maintained in distributed system 100 start, stop, lock, unlock, or change operational behavior according to the state.

In various embodiments, a hybrid quorum policy may include respective quorum policies for multiple quorum sets made up of nodes in a distributed system maintaining state. A hybrid quorum policy for distributed system 100 may, for instance implement three different quorum sets, quorum sets 110, 120 and 130. As illustrated in FIG. 1A, quorum set 110 includes nodes 112b, 112d and 112e. Nodes may themselves be included in multiple quorum sets (e.g., nodes 112b, 112d and 112e are also illustrated as included in quorum set 120 along with nodes 112a, 112c and 112f). Nodes may also be unique to or included in a single quorum set, such as node 112g which is illustrated as only included in quorum set 130.

Quorum set membership may be defined for various reasons. As discussed above, nodes in a distributed system may have different performance characteristics, failure characteristics or any other capability or configuration. Quorum set memberships for the quorum sets included in a hybrid quorum policy may be defined based on these differences. For example, in distributed system 100, nodes 112b, 112d and 112f may be configured to maintain a different version or view of state (e.g., a performance characteristic) than is maintained in nodes 112a, 112c and 112f, which are members of quorum set 120. Therefore, a quorum set 110 may defined to include nodes 112b, 112d and 112f. A respective quorum policy for quorum set 110 may also be defined based on the view maintained in the quorum set. Similarly, quorum set 120 may be defined based on a function or characteristic of nodes 112a, 112b, 112c, 112e and 112f. For example, the nodes in quorum set 120 may be configured to process updates to the state in distributed system 120 in certain manner. Node 112g may, for instance, process updates or other access requests differently, and consequently may be included in a different quorum set 130. For example, node 112g may be a device or devices that act as a cache for updates to the state, providing quick updates or reads. Alternatively, node 112g may represent a backup or data archive system which may store the state (e.g., data volume) in long term, durable storage (e.g., in case of catastrophic failure for other versions maintained at other nodes.

A hybrid quorum policy may describe how to evaluate the individual quorum policies for the respective quorum sets, as well as define how to determine whether the hybrid quorum policy for accessing state maintained in the distributed system as a whole is satisfied. For example, quorum set 110 may include 3 nodes, and the quorum policy for quorum set 110 (to update state maintained in distributed system) may include a requirement that 3/3 nodes in quorum set 110 acknowledge an update to versions of state maintained in the nodes as performed. For quorum set 120, which includes 6 nodes, the quorum policy for quorum set 120 may include a requirement that 4/6 nodes acknowledge the update to versions of state maintained at the nodes in quorum set 120. For quorum set 130, the quorum policy for quorum set 130 may include a requirement that 1/1 nodes acknowledge the update to versions of state maintained at the node in quorum set 130. The hybrid quorum policy for distributed system 100 may also indicate which of the individual quorum set policies may be satisfied in order to satisfy the hybrid quorum policy, describing the possible hybrid quorums that satisfy the hybrid quorum policy. For example, the hybrid quorum set policy for updates to data in distributed system 100 may be logically described as satisfied when:

((3/3 quorum set 110 OR 4/6 quorum set 120) AND 1/1 quorum set 130)

In various embodiments, the hybrid quorum policy for reading state in a distributed system may depend upon the hybrid quorum policy for updating state in the distributed system. For example, the hybrid quorum policy for reading state in a distributed system may be calculated such that the read hybrid quorum policy is satisfied by a minimally overlapping set of nodes in the distributed system that can satisfy the hybrid quorum policy for updating the state in the distributed system. Consider the example hybrid quorum policy for updating state in a distributed system given above. The hybrid quorum policy for reading state may be satisfied when:

((1/3 quorum set 110 AND 3/6 quorum set 120) OR 1/1 quorum set 130)

FIGS. 1B-1E described below illustrate examples of possible update and read quorums that may satisfy this example hybrid quorum policy.

Figure 1B:
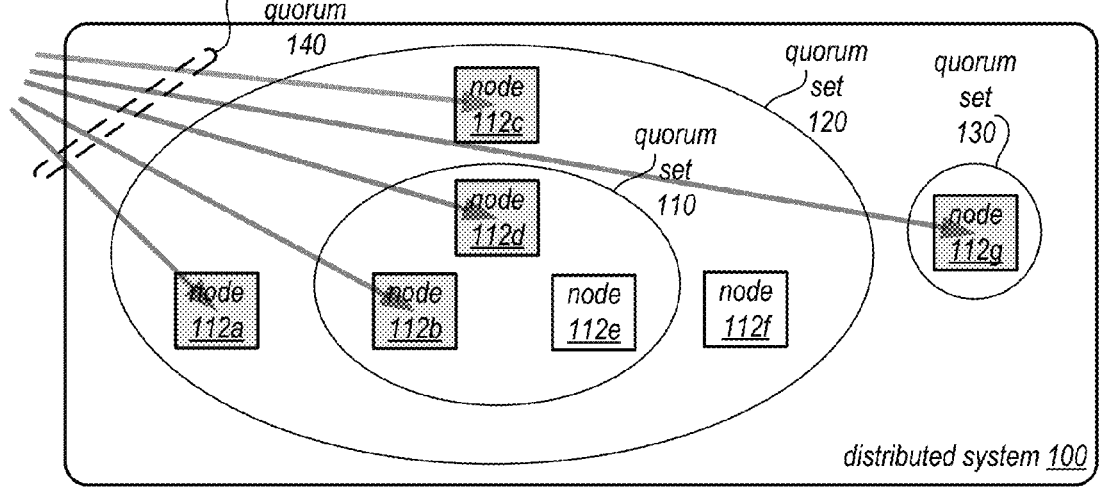

FIG. 1B illustrates an access request to update state maintained in a distributed system in satisfaction of a hybrid quorum policy. A request to update the state maintained in distributed system 100 may be sent to nodes 112 in distributed system 110. Nodes 112 in distributed system 100 may acknowledge that the update is performed. Based on the nodes 112 which have acknowledged performing the update, the hybrid quorum policy for updating the state in distributed system 100 may be determined to be satisfied or not satisfied. As part of determining whether the hybrid quorum policy is satisfied, the individual quorum policies for the quorum sets may be evaluated. For example, in FIG. 1B, then darkened nodes, 112a, 112b, 112c, and 112d may have acknowledged performing the update. Considering the example hybrid quorum policy described above, for quorum set 110, the individual quorum policy includes a requirement that 3/3 nodes in quorum set 110 acknowledge the update. As only 2/3 nodes (112b and 112d) have acknowledged, the individual quorum set policy for quorum set 110 is not satisfied. For quorum set 120, 4/6 nodes (112a, 112b, 112c and 112d) have acknowledged performance of the update, therefore the individual quorum set policy for quorum set 120 is satisfied. For quorum set 130 1/1 nodes (112g) have acknowledged performance of the update, so the individual quorum policy for quorum set 130 is satisfied. When the evaluations of the individual quorum policies are compared with the possible hybrid quorums identified by the hybrid quorum policy, it may be determined whether the acknowledged updates satisfy or do not satisfy the hybrid quorum policy. In the given example, either the policy for quorum set 110 has to be satisfied OR the policy for quorum set 120 has to be satisfied. Though the policy for quorum set for 110 is not satisfied in FIG. 1B, the policy for quorum set for 120 is satisfied, which satisfies the portion of the policy "3/3 quorum set 110 OR 4/6 quorum set 120." The hybrid quorum policy also includes a requirement that "1/1 quorum set 130" be satisfied, which is satisfied by the acknowledgement of node 112g. Thus, the acknowledgments illustrated in FIG. 1B satisfy the hybrid quorum policy and illustrate possible update quorum 140. Please note that more than sufficient nodes to satisfy the hybrid quorum policy may be sent the update request (e.g., all nodes), and thus the arrows are not intended to limit the number of nodes sent the request to update the state in distributed system 100.

Figure 1C:
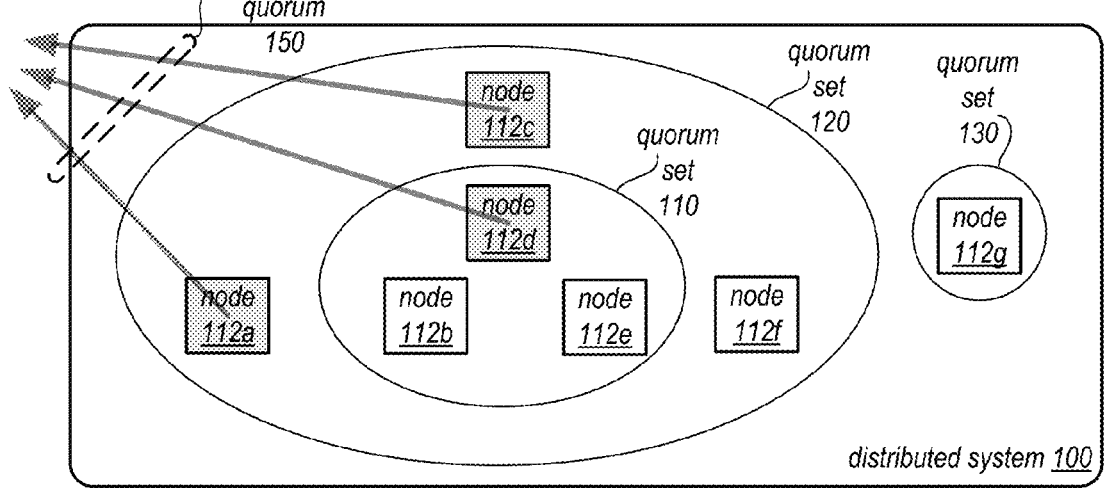
Figure 1D:
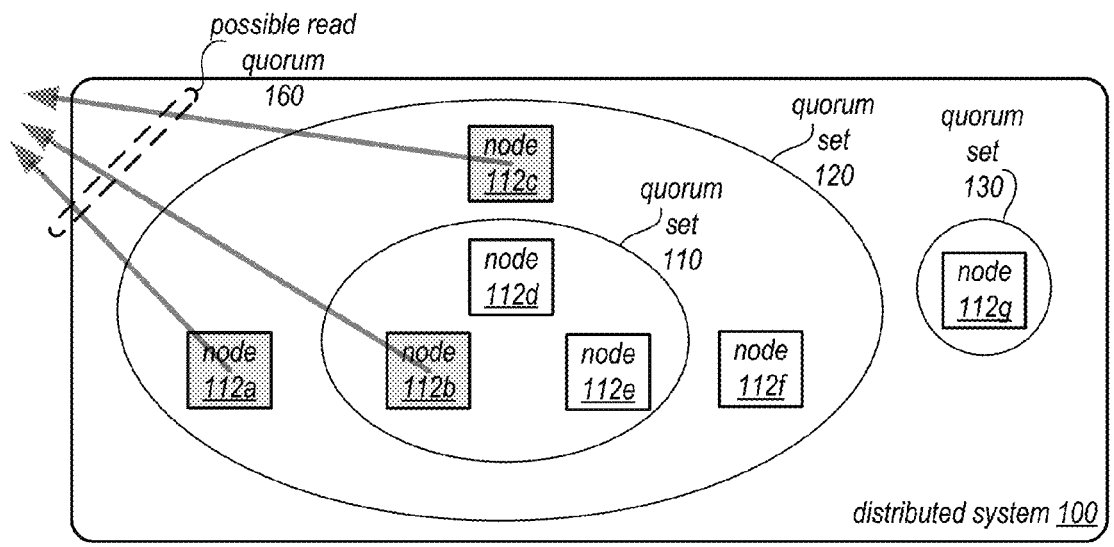
Figure 1E:
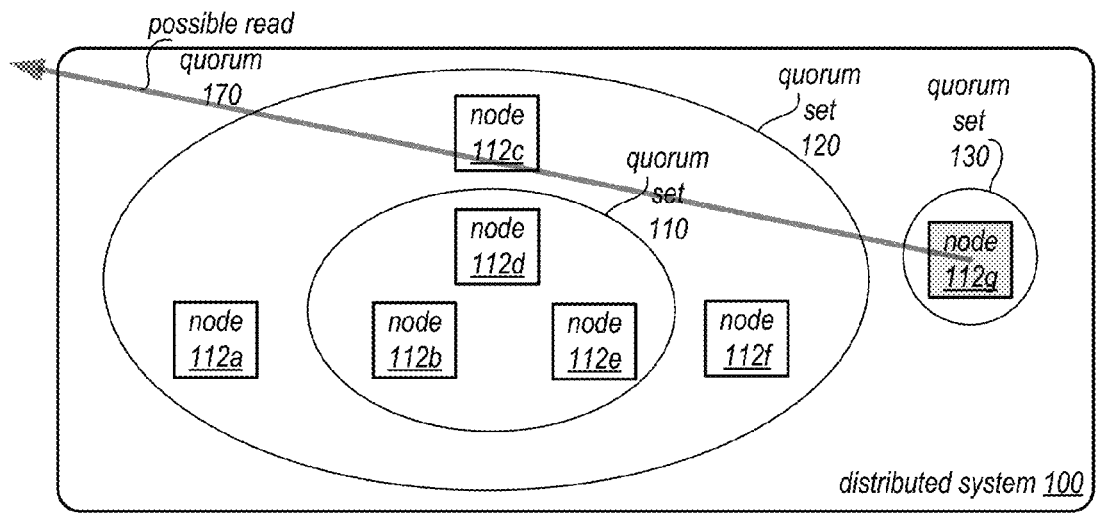

FIG. 1C illustrates an access request to read state maintained in a distributed system in satisfaction of a hybrid quorum policy. A request to read the state maintained in distributed system 100 may be sent to nodes 112 in distributed system 110. Nodes 112 in distributed system 100 may respond with a version of the state (a requested portion or information about the version of the state) maintained at the node. Based on the responses from nodes 112, a consistent version of the state maintained in distributed system 100 may be determined according to the hybrid quorum policy for reading the state in distributed system 100. As part of determining whether the responses satisfy hybrid quorum policy providing a read quorum, the individual quorum policies for the quorum sets may be evaluated. For example, in FIG. 1C, then darkened nodes, 112a, 112c and 112d may have responded to the read request. Considering the example hybrid quorum policy described above, for reading state from quorum set 110, the individual quorum policy includes a requirement that 1/3 nodes in quorum set 110 be included in a read quorum. As node 112d has responded, then the individual policy for quorum set 110 is satisfied. The example hybrid quorum policy also includes a requirement that 3/6 nodes in quorum set 120 be included in a read quorum. As nodes 112a, 112c and 112d have responded to be included in a read quorum, then the policy for quorum set 120 may be satisfied. The example hybrid quorum policy also includes a requirement for 1/1 nodes in quorum set 130 to be included. However, as node 112g has not responded, then the policy for quorum set 130 is not satisfied. When the evaluations for the individual quorum policies are considered in light of the hybrid quorum policy for identifying a possible hybrid read quorum, it may be determined whether the included responses do or do not satisfy the hybrid quorum policy. In the given example hybrid policy for reading state, both the policy for the quorum set 110 and the quorum set 120 have to be satisfied. As noted above, both of these quorum policies are satisfied, which is sufficient to establish a possible read quorum 150 based on the responses. Although the quorum policy for quorum set 130 is not satisfied, the hybrid quorum policy only describes that a read quorum may be alternatively satisfied "OR 1/1 quorum set 130" using responses from this quorum set. Similarly, in FIG. 1D, response from nodes 112a, 112b, and 112c may satisfy individual quorum policies for quorum sets 110 and 120 to establish possible read quorum 160. Alternatively, as noted above, a read quorum may be established based on receiving 1/1 from quorum set 130, as illustrated in FIG. 1E. Please note that more than sufficient nodes to satisfy the hybrid quorum policy may respond to the read request, and thus the arrows are not intended to limit the number of nodes that respond to the request to read the state in distributed system 100.

Hybrid quorum policies may be enforced or utilized by clients, systems or devices internal to or external to a distributed system. For example, in some embodiments, another component of a distributed system which is configured to access the state maintained in the distributed system may enforce hybrid quorum policies. Similarly, an external client of a distributed system may enforce hybrid quorum policies for access requests. In some embodiments, hybrid quorum policies may be determined or modified by a client or system enforcing the hybrid quorum policies, while in other embodiments, another system or component (e.g., a component of the distributed system) may provide an authoritative source for hybrid quorum policies to be enforced for accessing state in a distributed system.

As noted above, hybrid quorum policies may provide greater flexibility to cover different performance, failure, configuration, and/or other events that occur within a distributed system maintaining state. For example, as discussed below with regard to FIGS. 7 and 8, modification events may be detected to change hybrid quorum policies (e.g., to change the hybrid quorum policy to include original and new sets as part of a transition between quorum sets). Changes to hybrid quorum policies may include changing the requirements of individual quorum policies for reading/updating quorum sets, changing the number of quorum sets add or remove individual quorum policies, and/or changing the possible hybrid quorums that satisfy the hybrid quorum policy, in some embodiments.

Please note, FIGS. 1A-1E are provided as logical illustrations of hybrid quorum sets, and are not intended to be limiting as to the physical arrangement, size, or number of components, modules, or devices, implementing a distributed system, quorum set, or hybrid quorum policy.

The specification first describes an example of a distributed system, such as a distributed storage system that stores data for different storage clients. The distributed system may store data/maintain state for many different types of clients, in various embodiments. For example, one such client may be a database. Included in the description of the example distributed system are various examples of hybrid quorum policies. The specification then describes a flowchart of various embodiments of methods for implementing hybrid quorum policies for durable consensus of a distributed system. Next, the specification describes an example system that may implement the disclosed techniques. Various examples are provided throughout the specification.

Figure 2:
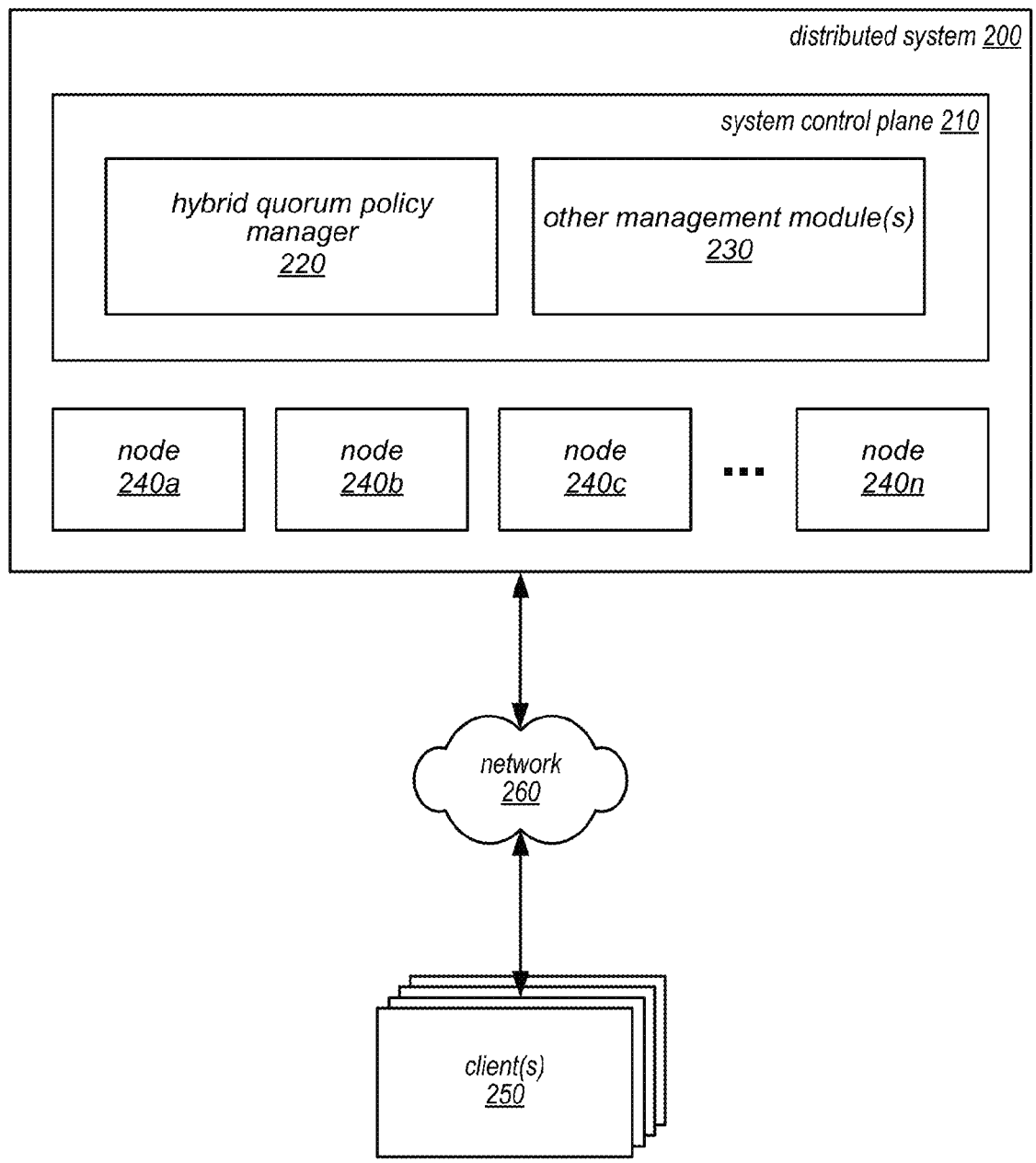
FIG. 2 is a block diagram illustrating a distributed system that implements hybrid quorum policies for updating and reading data stored in the distributed system, according to some embodiments.

FIG. 2 is a block diagram illustrating a distributed storage system that implements hybrid quorum policies for updating and reading data stored in the distributed storage system, according to some embodiments. Distributed system 200 may provide storage for data for a plurality of clients 250 distributed across storage nodes 240 that may respectively make up different distributed systems for respective clients 250. Clients may interact with distributed system 200 via a network 260. Access requests, which may be processed according to hybrid quorum policies may be sent from clients 250 via network 260 to different nodes 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system component (e.g., a component of the storage system) may be implemented by a particular node or may be distributed across several nodes. In some embodiments, a given node may implement the functionality of more than one system component (e.g., more than one storage system component).

In at least some embodiments, distributed system 200 may implement a distributed system control plane 210. Distributed system control plane 210 may manage the storage of data or state for various clients 250. In at least some embodiments, distributed storage control plane 201 may manage hybrid quorum policies for accessing data maintained in storage nodes 240. The hybrid quorum policies may be different for each respective data object, such as a data volume, maintained for clients 250, in some embodiments. Hybrid quorum policy manager 220, may be configured to create, track, modify and/or provide hybrid quorum policies for enforcement, in various embodiments. For example, hybrid quorum policy manager 220 may detect modification events for a hybrid policy quorum for a particular data volume maintained among certain storage nodes 240. Dependent on the detected modification event, hybrid quorum policy manager 220 may modify the hybrid quorum policy and provide it to clients 250 for enforcement when accessing the particular data volume. FIGS. 3, 4, 7 and 8, discussed below, provide various examples of modification events, hybrid quorum policies, and communicating hybrid quorum policy changes, which may be implemented by hybrid quorum policy manager 220, in various embodiments.

Storage system control plane 210 may also implement various other management modules 230. Other management modules 230 may be configured to provide different management services for distributed system 200. Other modules 230 may coordinate the metering and accounting of client usage of the storage system, implement financial accounting and billing systems, collect, monitor and/or aggregate a variety of storage system operational metrics, such as performance or failure metrics which may be used to trigger hybrid quorum policy changes at hybrid quorum policy manager 220. Other modules 210 may also implement user authentication and access control procedures, ascertaining whether a client 250 associated with an access request is authorized to access the particular data volume. Other management module(s) 230 may also be configured to initialize, configure, modify, delete or otherwise manage the data volumes or other data objects stored on behalf of clients, such as by assigning particular nodes 240 to a set of nodes maintaining a data volume for a client.

Distributed system may, in various embodiments, implement storage nodes, such as storage nodes 240*a*, 240*b*, 240*c* through 240*n* to provide distributed storage for storing data for clients 250. Different groups of storage nodes 240 may make up a set storage nodes that provide a distributed system for a particular client 250. In at least some embodiments, storage nodes 240 may store data for different clients as part of a multi-tenant storage service. Each storage node 240 may be configured to perform various operations to process access requests from clients 250, such as acknowledging the performance of updates to a version of data volume maintained at the storage node, as well as including a version of requested data in response to a read request from a client 250. Storage nodes 240 may have attached storage devices for persistent storage, such as hard disk drives, solid state drives, or various storage devices. In some embodiments, storage nodes 240 may provide volatile storage for caching or temporary storage for updates to a data volume.

Figure 5:
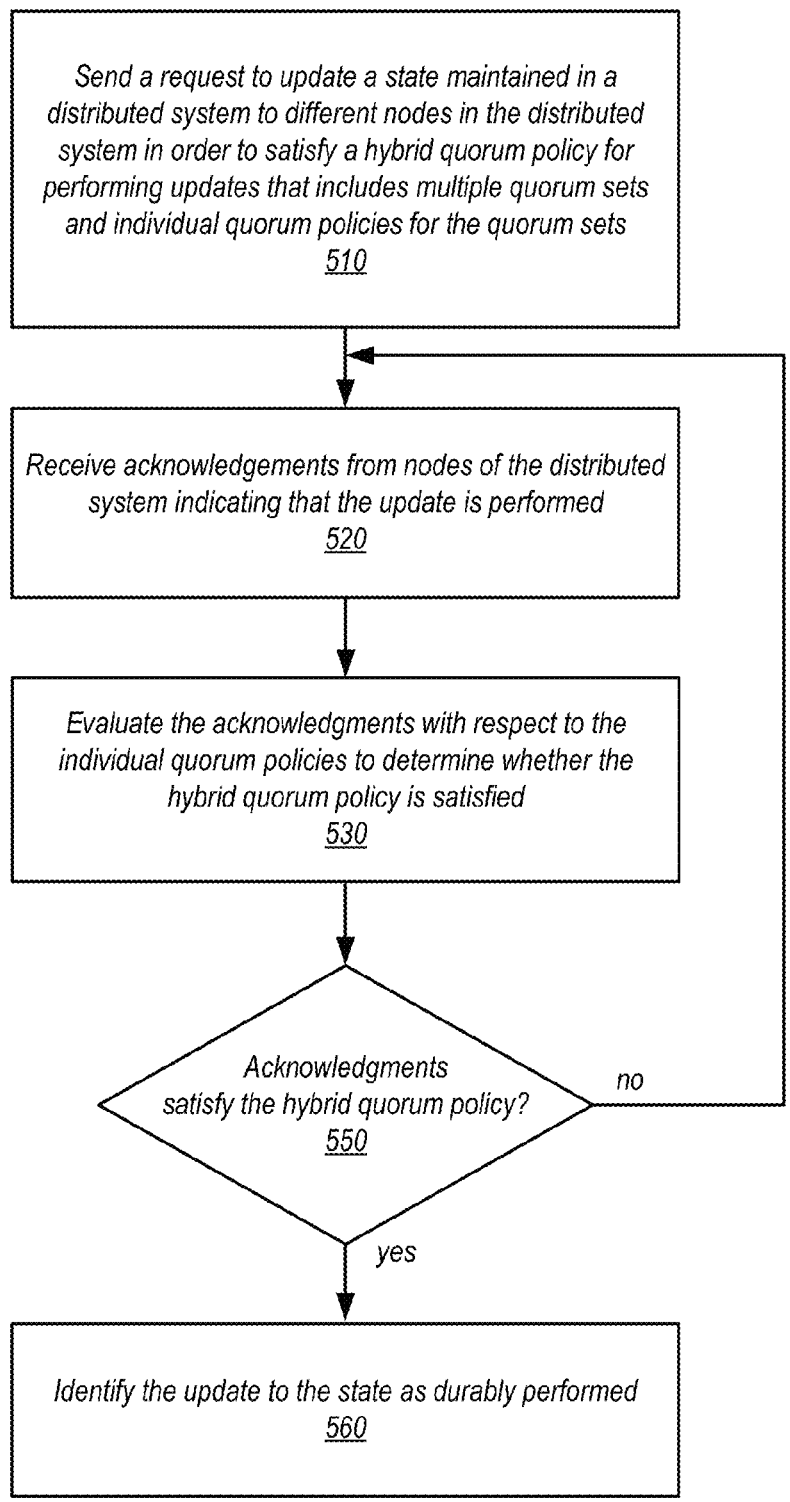
FIG. 5 is a high-level flowchart illustrating methods and techniques to implement a hybrid quorum policy for updating state maintained in a distributed system, according to some embodiments.
Figure 6:
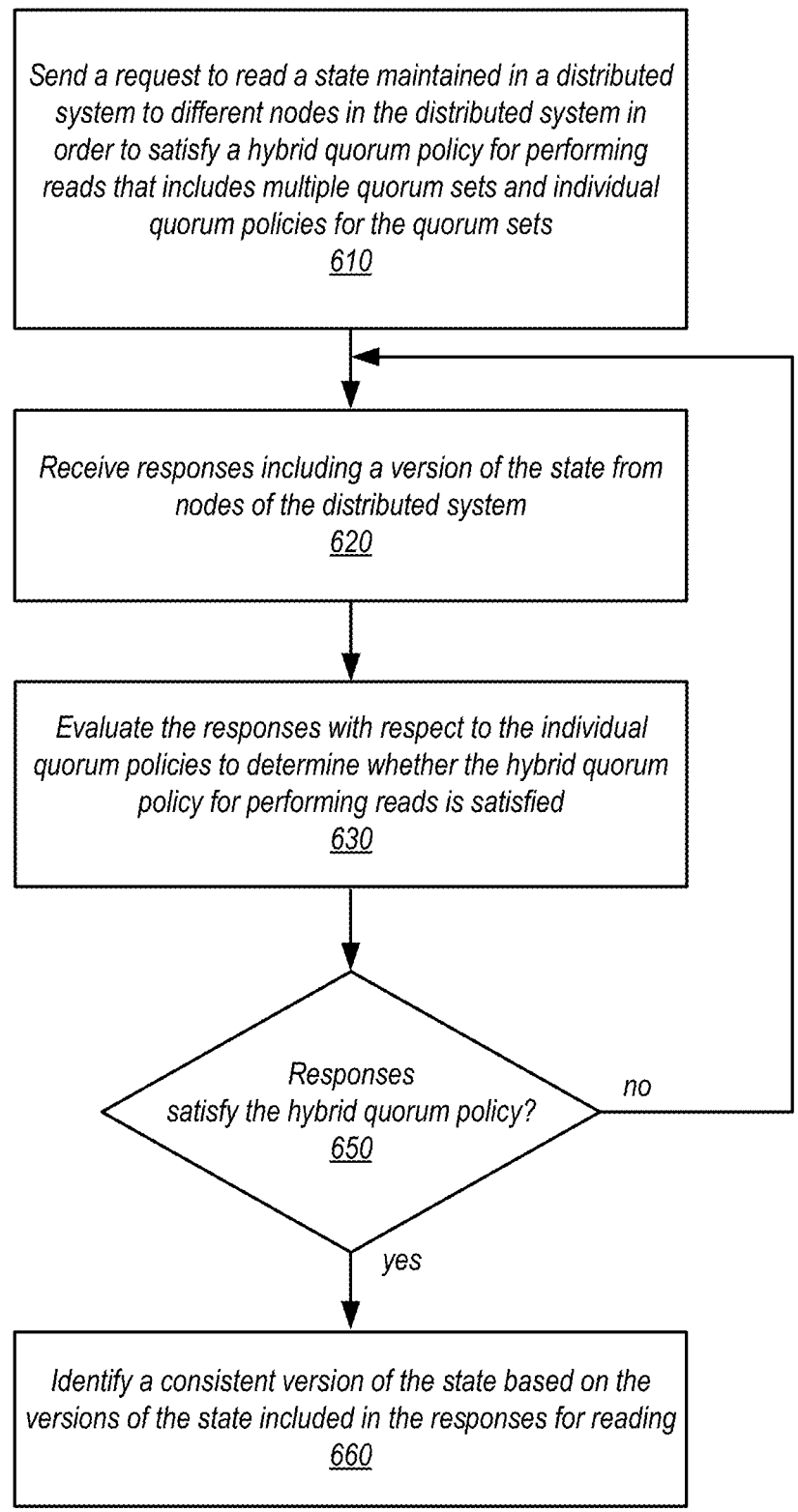
FIG. 6 is a high-level flowchart illustrating methods and techniques to implement a hybrid quorum policy for reading state maintained in a distributed system, according to some embodiments.

Clients 250 may encompass any type of client configurable to access data maintained for the client in distributed system 200. Clients 250 may be individual components, applications, or devices, or alternatively may be other distributed systems, such as a distributed database system that utilizes distributed system 200 to store data for databases managed at the distributed database system. In various embodiments, clients 250 may be configured to enforce hybrid quorum policies for accessing data maintained at different storage nodes in distributed system 200. FIGS. 5 and 6, discussed below, provide various examples of techniques for implementing hybrid quorum policies for different access requests to state maintained in a distributed system which may be applied to data maintained in a distributed storage system, as illustrated in FIG. 2. Clients 250 may, for example, receive indications of requests to update or read (at least a portion of) data maintained among storage nodes 240, and send update requests or read requests to storage nodes 240 in order to update/read the data. The responses/acknowledgments received from storage nodes 240 may be evaluated according to the hybrid quorum policy for updating the data or reading the data, and clients 250 may determine whether an update is durable or identify a consistent version of the portion of the data to provide for reading. In some embodiments, clients 250 may detect changes or modifications to hybrid quorum policies and/or make changes to hybrid quorum policies, as discussed below with regard to FIGS. 7 and 8.

Clients 250 may submit access requests to storage nodes 240 according to an interface for distributed system 200, such as an application programming interface (API). For example, a given client 250 may format update requests to send to particular storage nodes 240 according to the API. Similarly, read requests may also be formatted according to the API. Responses and acknowledgments from the storage nodes may also be formatted according to the API. Clients 250 may encompass an application such as a database application (or user interface thereof), a media application, an office application or any other application that may make use of storage resources to store and/or access one or more stored data objects in distributed system 200. In some embodiments, such an application may include sufficient protocol support for generating and processing requests to the data according to the API.

Clients 250 may convey access requests to and receive responses/acknowledgments from storage nodes 240 via network 260. In various embodiments, network 260 may encompass any suitable combination of networking hardware and protocols necessary to establish network-based-based communications between clients 250 and distributed system 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and distributed system 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and distributed system 200. It is noted that in some embodiments, clients 250 may communicate with distributed system 200 using a private network rather than the public Internet. For example, clients 250 may be provisioned within the same enterprise as a distributed system (e.g., a system that implements both clients 250 and distributed system 200). In such a case, clients 250 may communicate with distributed system 200 entirely through a private network 260 (e.g., a LAN or WAN that may use Internet-based communication protocols but which is not publicly accessible).

Hybrid quorum policies allow for the design and/or operation of distributed systems to account for a variety of different performance requirements/optimizations or failure scenarios. For example, in various embodiments hybrid quorum policies may be used for transitioning from one quorum set definition to another. If, for instance, one group of nodes is used to maintain replicas of a state (e.g., data) and it may be desirable to maintain the state in a different group of nodes (which may include some or none of the first group of nodes), hybrid quorum policy may be implemented as part of migrating the state (as well as updates to the state) from the first group to the second group. For example, the first group of storage nodes may be overburdened, whereas the second quorum set may have a greater capability to handle the workload involved with maintaining the state of the distributed system. In some cases, repairs, upgrades, or infrastructures changes may instigate quorum set transitions, while in other example scenarios individual node failures, larger rack or data center failures may invoke quorum set transitions.

Figure 3A:
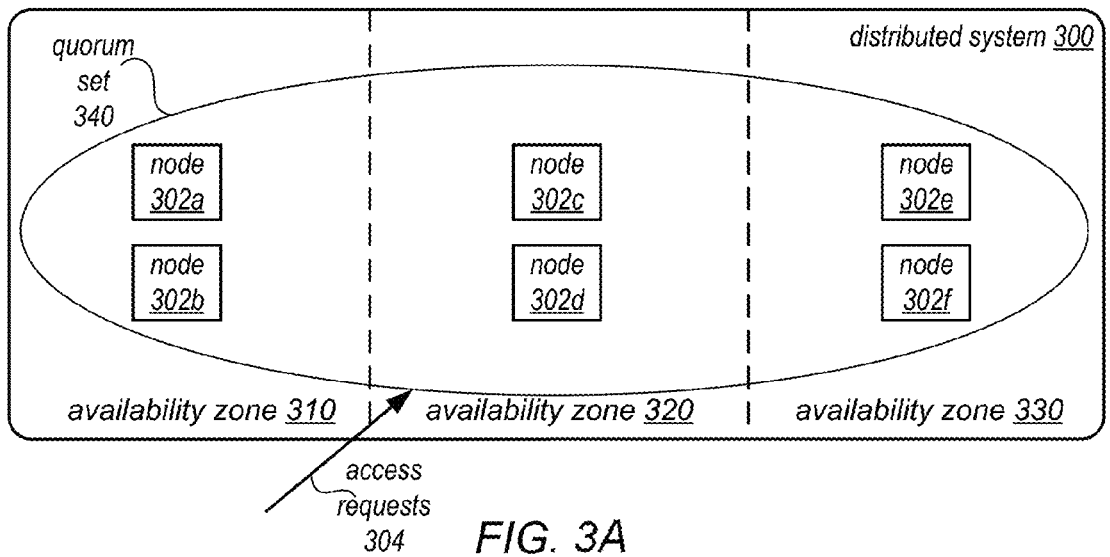
FIGS. 3A-3C are block diagrams illustrating a hybrid quorum policy implemented as part of transitioning from one quorum policy to another quorum policy in a distributed system, according to some embodiments.
Figure 3B:
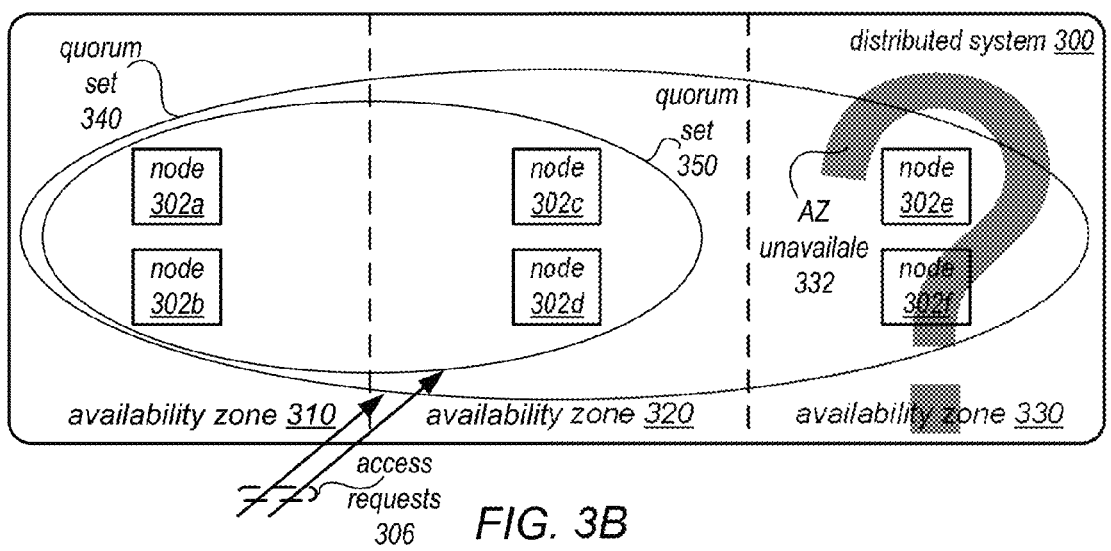
Figure 3C:
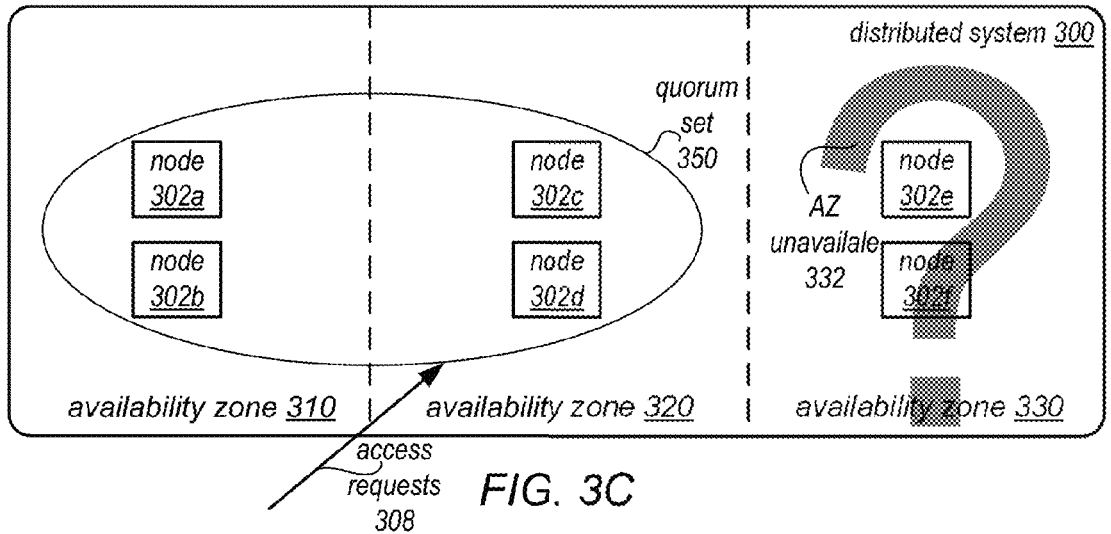

FIGS. 3A-3C are block diagrams illustrating a hybrid quorum policy implemented as part of transitioning from one quorum policy to another quorum policy in a distributed system, according to some embodiments. In some embodiments, a distributed system such as distributed system 300 (an example of distributed system 200 discussed above in FIG. 2) may implemented across multiple availability zones (e.g., data centers, fault tolerant zones, or any other configuration between availability zones that allows an availability zone to operate independently or without regard to failures of another availability zone). As illustrated in FIG. 3A, storage nodes 302 of distributed system 300 are implemented across three different availability zones, 310, 320 and 330. For instance, nodes 302a and 302 be are located in availability zone 310, nodes 302c and 302d are located in availability zone 320, and nodes 302e and 302f are located in availability zone 330. Distributed nodes 302 across the availability zones in this way increases the availability and durability of stored data, as the nodes in a particular availability zone may operate independent of a failure in another availability zone.

Quorum set 340 may be defined for handling updates to data maintained in the set of nodes 302. Thus, access requests 304 to update or read from stored data maintained in nodes 302 may have to satisfy the quorum policy for quorum set 340. For example, the quorum policy to update (e.g. write to) the data may include a requirement that 4/6 nodes 302 acknowledge the update as completed. While all of the nodes 302 and/or availability zones 310, 320 and 330 are available to handle update requests, satisfying the requirement for updates may not prove too challenging. However, if an availability zone becomes unavailable (e.g., due to a power failure or network partition), then the nodes located in the availability zone may also become unavailable.

In FIG. 3B, availability zone 330 has become unavailable 332, leaving nodes 302e and 302f unable to respond to access requests 304. Thus, the remaining four nodes 302a, 302b, 302c, and 302d would each have to complete every requested update in order to satisfy the quorum policy for quorum set 340. If availability zone 330 is unavailable for a long period of time, the chances of another node failure of one of the remaining four nodes increases, which would bring forward progress or availability of the stored data to a halt. Instead, if the quorum set policy for the data volume could be changed to, for example, 3/4 nodes 302, then at least one more node failure may be tolerated. For example, as illustrated in FIG. 3B, quorum set 350 may be defined including nodes 302a, 302b, 302c, and 302d, and a respective quorum policy (e.g., 3/4 nodes for updating the data).

In order to transition to a different quorum set, some synchronization and/or other configuration operations may be necessary. For example, in some embodiments the versions of data maintained at each node 302 may be stored according to a log-structured format (or other format that maintains a history of data). Updates or changes to the data may be recorded as log records, instead of making changes to the data itself. In order to introduce a new quorum set, some log records which may not be maintained at some of the storage nodes in the new quorum set may be replicated to the lacking nodes. In such a scenario, and various other scenarios, a hybrid quorum policy may be implemented in order to effect the transition from one quorum set to another by including both the original and new quorum sets together in a hybrid quorum policy, allowing time for the synchronization and/or configuration operations to take place. For example, in FIG. 3B quorum set 340 is illustrated as applicable and the members of quorum set 340 are still receiving access requests 306. Quorum set 350 may also receive access requests 306. A hybrid quorum policy may be defined in such a way as to provide durability and availability for serving access requests while the transition to quorum set 350 is performed. For example, a hybrid quorum policy may be defined to require "4/6 nodes 302 in quorum set 340 AND 3/4 nodes 302 in quorum set 350" in order to update data stored among the nodes 302. Similarly, a hybrid quorum policy for reading data from distributed system 300 may be determined (e.g., "3/6 nodes 302 in quorum set 340 OR 2/4 nodes 302 in quorum set 350") based on the hybrid quorum policy for updating the data.

Figure 8:
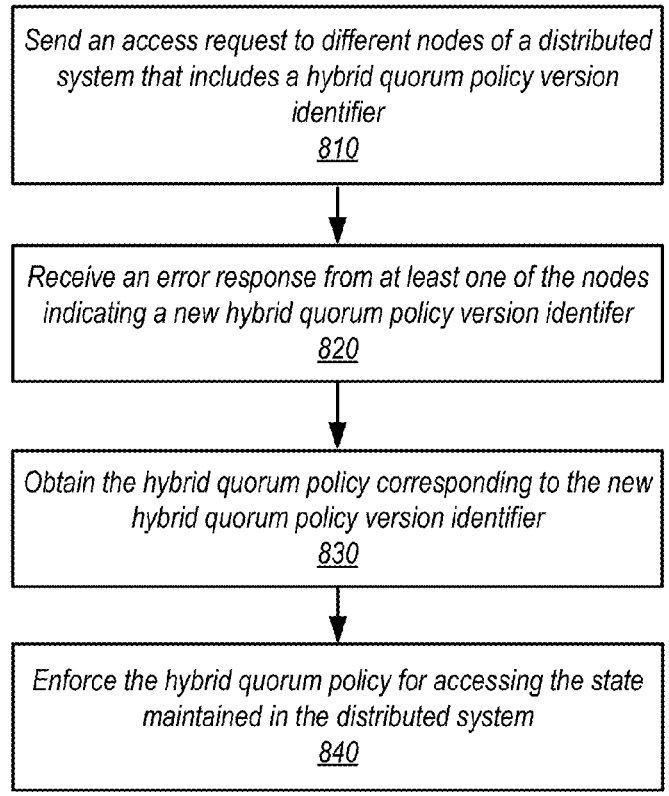
FIG. 8 is a high-level flowchart illustrating methods and techniques for retrieving and enforcing a modified hybrid quorum policy for accessing state maintained in a distributed system, according to some embodiments.

In at least some embodiments, changes to the hybrid quorum policy may be implemented without centralized coordination. For example, a hybrid quorum policy version identifier (e.g., an epoch) may be maintained at each node 302 in distributed system 300. When a new hybrid quorum policy is implemented or enforced, at least a node in every possible write quorum and a node in every possible read quorum may have to be written and acknowledge the new hybrid quorum policy version identifier. Access requests 306 directed toward nodes 302 in distributed system 300 may include a hybrid quorum policy version identifier. If the hybrid quorum policy version identifier included in the access request is not the most recent, then the access requests may be failed and a response may sent including the most recent hybrid quorum policy identifier. FIG. 8, discussed below, provides further examples of effecting changes to a hybrid quorum policy without centralized coordination, in various embodiments.

Once the synchronization and/or configuration operations are complete (or any other event or condition satisfied that triggers the transition to the new quorum set) the hybrid quorum policy for the distributed system 300 may be modified to include only the new quorum set. As illustrated in FIG. 3C, quorum set 350 services access requests 308 for data maintained in the distributed system. A quorum policy for quorum set 350 (e.g., 3/4 nodes 302 in quorum set 350 for updating the data) may be enforced for access requests 360.

Hybrid quorum policies may allow for changes or modifications to quorum sets in order to manage changes to the environment or operation of a distributed system. For example, although not illustrated, availability zone 330 may become available again, along with nodes 302e and 302f. While nodes 302e and 302f may not be current, updates or changes to create a current version of the data on these nodes may be less costly than creating new storage nodes in availability zone 330. The hybrid quorum policy may be changed again to include quorum set 340 again, and as illustrated in FIG. 3B access requests may again be sent to both quorum set 340 and 350. Once the nodes 302e and 302f are sufficiently synchronized with the other storage nodes, the hybrid quorum policy may be modified again to include only quorum set 340 (as illustrated in FIG. 3A above). In some embodiments, multiple new quorum sets may be added or removed from the hybrid quorum set policy. For example, if a particular node failed in a "live" availability zone (e.g., node 302c in az 320) another node may be provisioned in its place, and an additional quorum set defined in the hybrid quorum policy to include the additional quorum set and new node). There may be some instances where an entirely or mostly different set of storage nodes are provisioned or started up to maintain data for distributed system 300 and the hybrid quorum policy modified to include one or more quorum sets for the new storage nodes. Thus, the previous examples discussed above with regard to FIGS. 3A-3C are not intended to be limiting.

Hybrid quorum policies may also be used to account for the different performance or failure characteristics of nodes within a distributed system. For example, a single quorum set may be able to account for a single failure characteristic. If, for instance, a certain number of nodes are required to maintain versions of state for the distributed database, than the number of nodes may provide a certain level of redundancy or availability determined according to the total number of nodes. However, if different ones of the nodes (e.g., pairs or other groupings of nodes) are subject to common or correlated failures or performance characteristics, the single quorum set may be unable to account for these differences. A hybrid quorum policy may allow for additional quorum sets to cover or optimize these differences.

Figure 4:
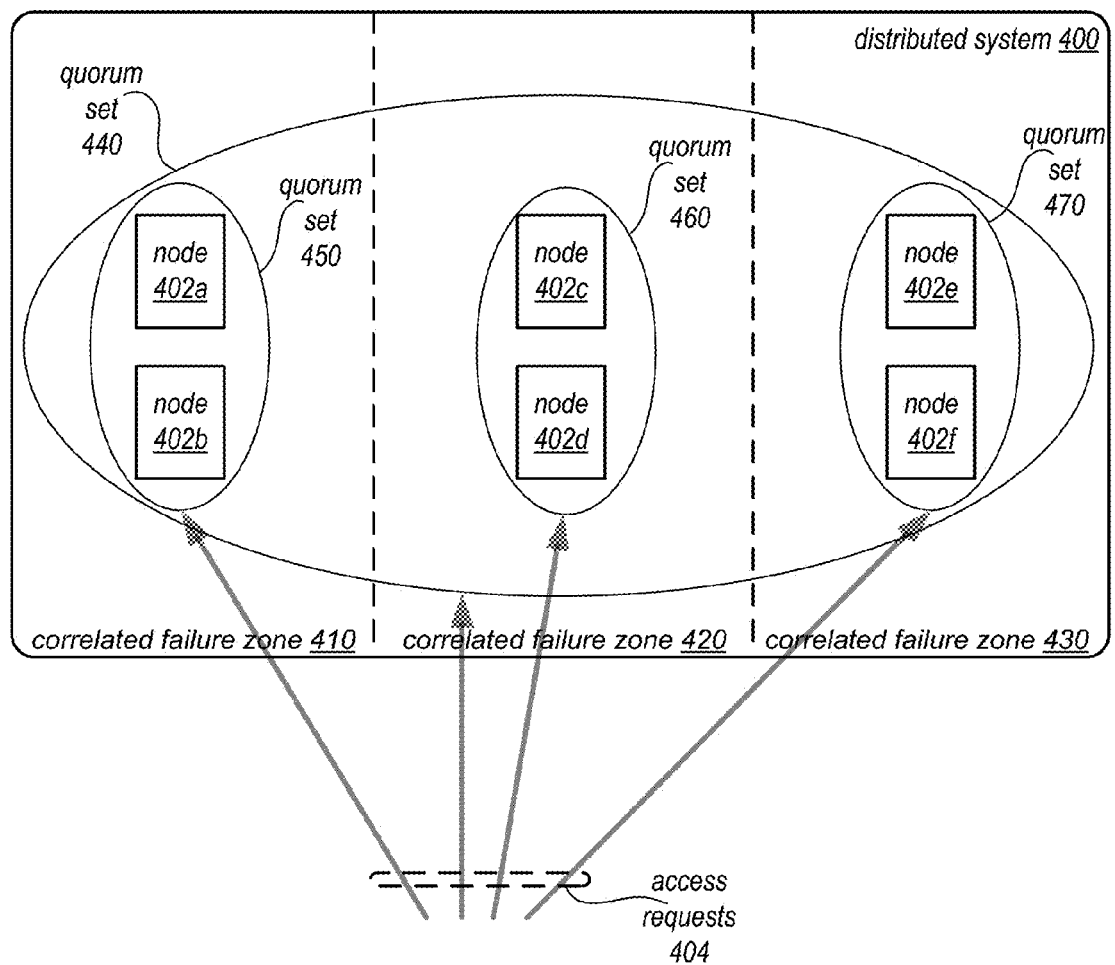
FIG. 4 is a block diagram illustrating a hybrid quorum policy of quorum sets associated with different failure characteristics in a distributed system, according to some embodiments.

FIG. 4 is a block diagram illustrating a hybrid quorum policy of quorum sets associated with different failure characteristics in a distributed system, according to some embodiments. For example, distributed system 400 may maintain data in various versions at nodes 402a, 402b, 402c, 402d, 402e, and 402f. While each of these nodes 402 may individually maintain data or operate in a similar manner, each node 402 may be located within a different correlated failure zone. For example, nodes 402a and 402b may be implemented in correlated failure zone 410, nodes 402c and 402d may be implemented in correlated failure zone 420, and nodes 402e and nodes 402f may be located in correlated failure zone 430. A correlated failure zone may be any common location, operation or infrastructure where a failure of the zone causes the nodes located in the zone to fail (e.g., availability zone, data center, server racks, or server hosting multiple nodes). For instance, if correlated zone 410 were to suffer a power or network failure, then nodes 402a and 402b would be no longer available to service access requests 404.

For various reasons, it may be desirable to maintain availability/durability requirements for each correlated failure zone. For example, communications between nodes maintained in different correlated failure zones may be costly, creating sub-optimal distributed system performance if data has to be transferred from one zone to another (e.g., in the event of a node or zone failure). A single quorum set, such as quorum set 440 (including nodes 402a, 402b, 402c, 402d, 402e, and 402f), with a single quorum requirement may not be able to ensure that the durability/availability requirement the correlated failure zones are individually met (e.g., 1/2 nodes in each zone for updating the data) while maintaining a quorum requirement that efficiently processes update requests (e.g., not requiring 5/6 or 6/6 nodes for each update). Instead, different quorum sets 450, 460, and 470 may be implemented to ensure that availability and durability requirements for the correlated failure zones 410, 420 and 430 are satisfied. For example, in some embodiments, updates to the state is performed across the quorum sets such that the hybrid quorum policy for updating the state is not satisfied without updating more than the one or more nodes subject to the correlated failure characteristic (e.g., more than nodes 402e and 402f). In another example, an update may be performed according to a hybrid quorum such that a recovery operation of the state may be performed in the event of a failure of the one or more nodes in the correlated failure zone.

Consider an example hybrid quorum policy for updating data in the distributed system illustrated in FIG. 4, where requirements that "4/6 nodes 402 in quorum set 440 AND (1/2 nodes 402 in quorum set 450 AND 1/2 nodes 402 in quorum set 460 AND 1/2 nodes 402 in quorum set 470)" are included. According to this example hybrid quorum policy, updates may still be processed at a more efficient rate (with only a minimum of 4 acknowledgments), while the availability/durability requirements for the nodes in the correlated failure zones 410, 420, and 430 may still be satisfied. Implementing hybrid quorum policies to account for different performance or failure characteristics, such as the example given above, may prevent sub-optimal distributed system performance which might occur if the availability/durability requirements are not met for correlated failure zones, in various embodiments.

The techniques described above with regard to FIGS. 1-4 may be implemented for many diverse types or collections of nodes with similar performance or failure characteristics. For example, quorum sets may be defined for nodes that implement certain types of hardware (e.g., memory-based data storage, hard disk drive storage, or solid-state drive storage). In other examples, distributed system architecture (defining the same or different functionalities or roles for nodes) or location of nodes within a network may also be accounted for, such as whether a particular node is remote or local to a client or other system that is performing updates according to the hybrid quorum policy. In some embodiments, for instance, the nodes in different quorum sets are subject to a different common performance characteristic. An update hybrid quorum policy may be enforced such that a read request for the state of the distributed system is serviced according to a faster one of the two different quorum sets (e.g., serving a read request from cache node instead of a durable storage node). Therefore, the possibilities for defining and enforcing hybrid quorum policies for maintaining state in distributed systems are not limited to the examples given above. Moreover, although these examples are given with regard to a distributed system (e.g., distributed system 200 in FIG. 2, system 300 in FIGS. 3A-3C, and system 400 in FIG. 4), the previously described techniques are not limited to such systems. FIG. 5 is a high-level flowchart illustrating methods and techniques to implement a hybrid quorum policy for updating state maintained in a distributed system, according to some embodiments.

As indicated at 510, a request to update state maintained in a distributed system may be sent to different nodes in the distributed system in order to satisfy a hybrid quorum policy for performing updates to the state, in some embodiments. For example, the requests to update state may be sent to a minimum number of nodes to satisfy the hybrid quorum requirement, or the requests may be sent to a greater number or all of the nodes. The hybrid quorum policy may include multiple quorum sets and individual quorum requirements for the quorum sets, as discussed below with regard to elements 530 and 540. Note that a single update request may be sent to a node that is a member of multiple quorum sets.

As indicated at 520, acknowledgments may be received from nodes of the distributed system indicating that the update is performed at a respective node, in various embodiments. For example, each node that receives the update request may respond with an acknowledgment indicating that the update request is performed at the sending node. In some embodiments, nodes may also provide acknowledgments for other nodes (e.g., if a synchronization protocol, such as a gossip-based protocol is performed and the sending node has shared the update with another node), which the sending node can determine have performed the update.

As indicated at 530, update acknowledgments may be evaluated with respect to the individual quorum policies to determine whether the hybrid quorum policy is satisfied, as indicated at 530. For example, a hybrid quorum policy may include requirements for 4 quorum sets $Q_1$, $Q_2$, $Q_3$, and $Q_4$. The responses from member nodes of the respective quorum sets may each be evaluated with respect to the individual quorum policy for the quorum set. For example, if $Q_1$ has a requirement that 3/4 nodes in the quorum set acknowledge an update, then responses received from nodes that are members of $Q_1$ will be evaluated. As some nodes may be members of multiple quorum sets, a single acknowledgement from a node may be used in the evaluation of multiple individual quorum policies. Based on the evaluations of the individual quorum policies for the quorum sets a hybrid quorum satisfying the hybrid quorum policy may be identified or not, as indicated at 550. For instance, the hybrid quorum policy for performing updates to the state maintained in the distributed system may be satisfied when:

($Q_1$ OR $Q_2$) AND ($Q_3$ OR $Q_4$)

Thus if sufficient acknowledgments for $Q_1$ and $Q_3$ are received that satisfy the respective individual quorum policies, then the nodes that satisfy the quorums for $Q_1$ and $Q_3$ may establish a hybrid quorum sufficient to satisfy the example hybrid quorum policy described above for performing updates to the state maintained in the distributed system.

As indicated by the positive exit from 550, if the hybrid quorum policy for the distributed system is satisfied, then the update to the state may be identified as durable, as indicated at 560, in some embodiments. For instance, a report or acknowledgment may be sent or made to an application or other system component or device that is configured to perform updates to the state in the distributed system (e.g., such as storage client 250 described above with regard to FIG. 2). If the hybrid quorum policy is not satisfied, as indicated by the negative exit from 550, then the evaluation of acknowledgments 530 may be performed again as more acknowledgements are received 520. In some embodiments, a timeout or error message may be sent failing the update request to a client if after a period of time the hybrid quorum policy is not satisfied.

FIG. 6 is a high-level flowchart illustrating methods and techniques to implement a hybrid quorum policy for reading state maintained in a distributed system, according to some embodiments. As indicated at 610, a request to read a state maintained in a distributed system may be sent to different nodes in the distributed system in order to satisfy a hybrid quorum policy for performing reads of the state, in some embodiments. For example, the requests to read state may be sent to a minimum number of nodes to satisfy the hybrid quorum requirement, or the requests may be sent to a greater number or all of the nodes. The hybrid quorum policy may include multiple quorum sets and individual quorum requirements for the quorum sets, as discussed below with regard to elements 630 and 640. As discussed above, a hybrid quorum policy for reading state may be determined based on a hybrid quorum policy for updating state. For instance, in various embodiments a hybrid quorum policy for reading state may be determined as a minimally overlapping set of nodes with respect to any possible hybrid quorum that satisfies the hybrid quorum policy for updating the state maintained in the database. Note that a single read request may be sent to a node that is a member of multiple quorum sets.

As indicated at 620, responses may be received from nodes of the distributed system including a version of the requested state, in various embodiments. For example, each node that receives the read request may respond with the version of the requested portion of state as maintained at the node (which may be indicated by a timestamp, log sequence number (LSN) or other indicator of version or ordering which may be used to determine a version of the state). As indicated at 630, read responses may be evaluated with respect to the individual quorum policies for reading state from the distributed system to determine whether the hybrid quorum policy is satisfied. Consider the example of 4 quorum sets $Q_1$, $Q_2$, $Q_3$, and $Q_4$ given above with respect to FIG. 5. The responses from member nodes of the respective quorum sets may each be evaluated with respect to the individual quorum policy for the quorum set. For example, if $Q_1$ has a requirement that 2/4 nodes in the quorum set be part of a read quorum, then responses received from nodes that are members of $Q_1$ will be evaluated to determine whether or not at least 2 responses were received. As some nodes may be members of multiple quorum sets, a single response from a node may be used in the evaluation of multiple individual quorum policies. Based on the evaluations of the individual quorum policies for the quorum sets a read hybrid quorum satisfying the hybrid quorum policy for may be identified or not, as indicated at 650.

As indicated by the positive exit from 650, if the hybrid quorum policy for the distributed system is satisfied based on the responses, then a consistent version of the state based on the responses may be identified for reading, as indicated at 660, in some embodiments. In some embodiments, the current version of the state may be provided by a client (e.g., such as storage client 250 described above with regard to FIG. 2) to another system for processing, or may be used for processing at the client. If the hybrid quorum policy is not satisfied, as indicated by the negative exit from 650, then the evaluation of responses 630 may be performed again as more acknowledgements are received 620. In some embodiments, a timeout or error message may be sent failing the update request to a client if after a period of time the hybrid quorum policy is not satisfied.

Figure 7:
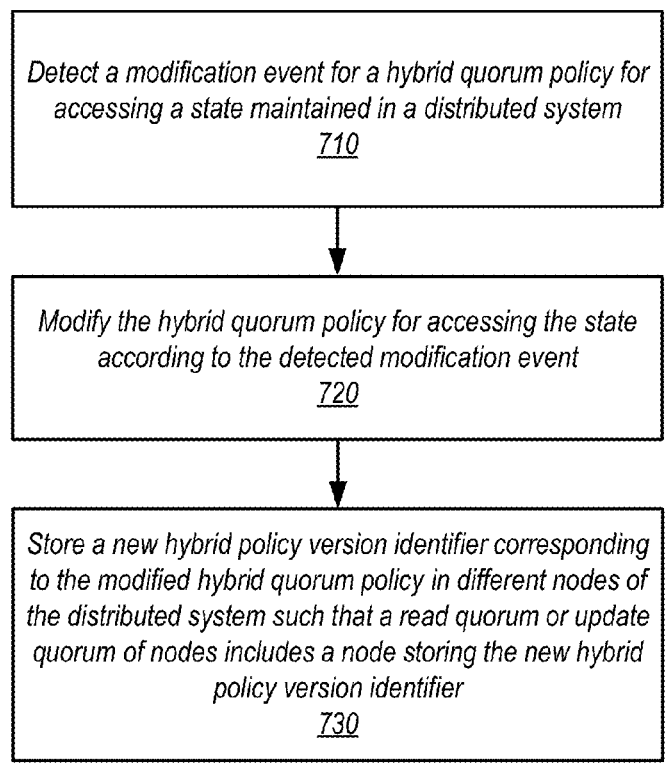
FIG. 7 is a high-level flowchart illustrating methods and techniques for modifying a hybrid quorum policy for accessing state maintained in a distributed system, according to some embodiments.

Hybrid quorum policies may be implemented in distributed systems to dynamically react to or account for changes in the distributed system. As discussed above with regard to FIGS. 3A-3C, different failure scenarios, for example, may instigate a change to quorum sets and/or policies enforce for state in a distributed system. Thus, the hybrid quorum policy for a distributed system may be modified, in some embodiments. FIG. 7 is a high-level flowchart illustrating methods and techniques for modifying a hybrid quorum policy for accessing state maintained in a distributed system, according to some embodiments.

As indicated at 710, a modification event for a hybrid quorum policy for accessing (e.g., updating or reading) a state maintained in a distributed system may be determined, in various embodiments. Different types of modification events may be detected. For example, a modification event may be a failure event, such as detecting a failure of one or more nodes in distributed system, a data center, availability zone, server rack or any other type of distributed system failure impacts the operation of the distributed system. A network partition, for instance, may prevent network communications (e.g., update or read requests) from reaching nodes located in a particular availability zone. A power failure, may impact nodes implemented in a particular data center, in another example. The hardware and/or software implement nodes may also fail, triggering node failure, or a change in the operation of the nodes of the distributed system. A modification event may also be detected with regard to an event detected based on the performance or health of a particular node or set of nodes. For example, a node may be subjected to heavy workload (e.g., the node is a multi-tenant performing work for other distributed systems), and thus it may be desirable to shift the burden of maintaining a version of the state to another/new node. In another example, one or more nodes may be scheduled for maintenance or upgrade operations, causing a need to shift state from the affected nodes to other nodes.

In various embodiments, in response to detecting the modification event, the hybrid quorum policy may be modified according to the detected modification event, as indicated at 720. One or more quorum sets may be added or removed based on the detected modification event, in a least some embodiments. For example, as illustrated above with regard to FIG. 3C, the hybrid quorum policy may be modified to remove a quorum set from the hybrid quorum policy (and thus the respective individual quorum policy for the removed set). In another example, if a node fails, then a new quorum set may be added to cover an additional storage node added to the distributed system, or a change in quorum policy with respect to the remaining nodes. Quorum policies for the individual quorum sets (changing the numbers of required responses or acknowledgments up or down, even to 0 or all nodes in a quorum set) may be modified and/or the hybrid quorum policy as a whole may be modified (e.g., changing ORs to ANDs, or ANDs to ORs) describing the possible hybrid quorums that satisfy the hybrid quorum policy. In various embodiments, a change may be first determined for the hybrid quorum policy for performing updates to the state maintained in the distributed system, and then in some embodiments a resultant hybrid quorum policy for reading the state in the distributed system may be determined based on the modified hybrid quorum policy for performing updates.

The modified hybrid quorum policy for accessing the state of the distributed system may be provided for subsequent enforcement. For example, in some embodiments, a hybrid-quorum policy manager (such as hybrid quorum policy manager 220 in FIG. 2) or other system component or device may define, track, and store modifications to a hybrid quorum policy for state maintained in a distributed system and disseminate the modified hybrid quorum policy for enforcement. In at least some embodiments, providing notice of a change to the hybrid quorum policy may be performed without centralized coordination. For example, in at least some embodiments a hybrid policy version identifier may be recorded at each node, identifying the version of the hybrid quorum policy to be applied to access requests. If, an access request is received that includes an obsolete hybrid quorum policy version number, then an error response may be sent in response indicating the new hybrid quorum policy version number (which may be used to obtain the modified hybrid quorum policy). For example, as indicated at 730, a new hybrid policy version number corresponding to the modified hybrid quorum policy may be stored in different nodes of the distributed system such that a possible read quorum or a possible update quorum may include one of the nodes with the new hybrid policy version identifier. FIG. 8 is a high-level flowchart illustrating methods and techniques for retrieving and enforcing a modified hybrid quorum policy for accessing state maintained in a distributed system using a hybrid quorum policy version identifier, according to some embodiments.

As indicated at 810, an access request may be sent to different nodes of a distributed system (to update or read state) and may include a hybrid quorum policy version identifier, in various embodiments. If non-error responses are received then techniques for determining whether quorum is satisfied, as described above with regard to FIGS. 5 and 6, may be applied. In some embodiments, however, an error message may be received from at least one of the nodes indicating a new hybrid quorum policy version identifier. As indicated at 830, the modified hybrid quorum policy for the state may be obtained corresponding to the new hybrid quorum policy version identifier, in various embodiments. For instance, a client may request and receive the hybrid quorum policy from an authoritative source (such as hybrid quorum policy manager 220 in FIG. 2). In some embodiments, a client itself may manage/modify hybrid quorum requirements. Once obtained, the modified hybrid quorum requirement may be enforced against subsequent access requests (as described above with regard to FIGS. 5 and 6).

Hybrid quorum policy modification may be performed many times over the time that state is maintained in a distributed system. For example, some failure scenarios may involve a long-term change in the capabilities or configuration of a distributed system. Similarly, changes in the performance capabilities (e.g., the addition of new nodes or types of nodes) may alter the hybrid quorum policy permanently. In some embodiments, hybrid quorum policy changes may be temporary, and rolled-back when a particular modification event no longer occurs or is detected.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
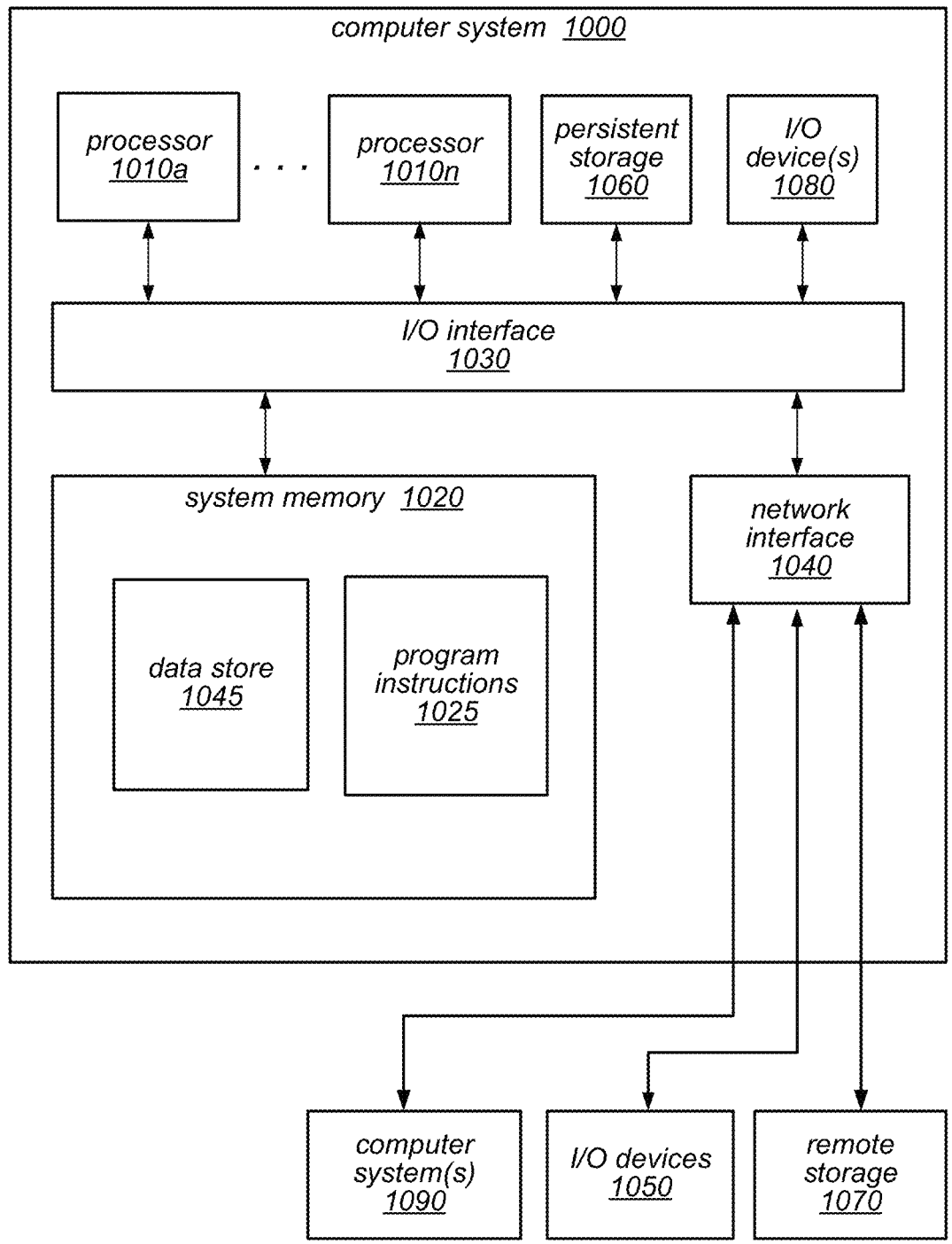
FIG. 9 is an example computer system, according to various embodiments.

FIG. 9 is a block diagram illustrating a computer system configured to implement at least a portion of the various nodes, systems, or components of the distributed systems, such as the example distributed system described herein, according to various embodiments. For example, computer system 1000 may be configured to implement various storage nodes of a distributed storage system that stores data on behalf of clients, in different embodiments, or more generally implement any of the various types of nodes or components that may be implemented as part of a distributed system. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed system node or client of a distributed system or hybrid quorum policy manager. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the storage system described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage system may be stored in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, the distributed storage systems described herein may be offered to clients as a network-based service. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor;
    a memory comprising program instructions, wherein the program instructions when executed by the at least one processor, cause the at least one processor to:
        receive an indication of an update to a state maintained in a distributed system for a client, wherein the distributed system comprises a plurality of nodes that maintain the state for the client;
        in response to the receipt of the indication, send a request to update the state according to the indicated update to different ones of the plurality of nodes in order to satisfy a hybrid quorum policy for updating the state maintained in the distributed system, wherein the hybrid quorum policy comprises individual quorum policies for a plurality of different quorum sets, wherein each quorum set includes one or more nodes of the plurality of nodes such that a given node of the plurality of nodes is included in at least one quorum set of the plurality of quorum sets;
        receive a plurality of acknowledgments from at least some of the different nodes sent the request indicating that the update to the state is performed;
        in response to the receipt of the plurality of acknowledgments, determine that the plurality of acknowledgements satisfy the hybrid quorum policy for updating the state maintained in the distributed system, wherein the determination evaluates the plurality of acknowledgments with respect to the individual quorum policies for the plurality of different quorum sets and with respect to an indication in the hybrid quorum policy of which individual quorum policies are to be satisfied; and
        in response to the determination that the plurality of acknowledgments satisfy the hybrid quorum policy, provide an indication that the update to the state is durably performed for the client.

2. The system of claim 1, wherein the program instructions further cause the at least one processor to:
    receive an indication of a request to read at least a portion of the state maintained in the distributed system for the client;
    in response to the receipt of the indication to read the portion of the state, send a read request for the portion of the state to at least some of the plurality of nodes in order to satisfy a hybrid quorum policy for reading the state maintained in the distributed system, wherein the hybrid quorum policy for reading the state comprises individual read quorum policies for the plurality of different quorum sets;
    receive a plurality of responses from different ones of the at least some nodes sent the read request, wherein the responses respectively comprise a version of the requested portion of the state;
    in response to the receipt of the plurality of responses, determine that the plurality of plurality of responses satisfy the hybrid quorum policy for reading the state maintained in the distributed system, wherein the determination evaluates the plurality of responses with respect to the individual read quorum policies for the plurality of different quorum sets; and
    in response to the determination that the plurality of responses satisfy the hybrid quorum policy for reading the state, identify a consistent version of the portion of the state to provide as the requested portion of the state based, at least in part, on the respective versions of the requested portion of the state.

3. The system of claim 1, wherein the one or more nodes included in at least one of the plurality of different quorum sets are subject to a correlated failure characteristic, wherein the update to the state is performed across the quorum sets such that the hybrid quorum policy for updating the state is not satisfied without updating more than the one or more nodes subject to the correlated failure characteristic.

4. The system of claim 1, wherein the program instructions further cause the at least one processor to:
    detect a modification to the hybrid quorum policy;
    obtain the modified hybrid quorum policy; and
    in response to receipt of an indication for another request to update the state in the distributed system, perform the send, the receive, the determination, and the provision for the other request according to the modified hybrid quorum policy.

5. A method, comprising:
    performing, by one or more computing devices:
        sending a request to update a state maintained in a distributed system to different ones of a plurality of nodes that comprise the distributed system in order to satisfy a hybrid quorum policy for updating the state maintained in the distributed system, wherein the hybrid quorum policy comprises individual quorum policies for a plurality of different quorum sets, wherein each quorum set includes one or more nodes of the plurality of nodes such that a given node of the plurality of nodes is included in at least one quorum set of the plurality of quorum sets;
        receive a plurality of acknowledgments from at least some of the different nodes sent the request indicating that the update to the state is performed;
        determining that the plurality of acknowledgements satisfy the hybrid quorum policy for updating the state maintained in the distributed system, wherein said determining comprises: evaluating the plurality of acknowledgments with respect to the individual quorum policies for the plurality of different quorum sets and with respect to an indication in the hybrid quorum policy of which individual quorum policies are to be satisfied; and
        in response to determining that the plurality of acknowledgments satisfy the hybrid quorum policy, identifying the update to the state as durably performed.

6. The method of claim 5, wherein the one or more nodes included in at least two of the plurality of different quorum sets are subject to a different common performance characteristic such that a read request for the state of the distributed system is serviced according to a faster one of the two different quorum sets.

7. The method of claim 5, wherein the one or more nodes included in at least one of the plurality of different quorum sets are located in a correlated failure zone such that recovery operation of the state may be performed in the event of a failure of the one or more nodes in the correlated failure zone.

8. The method of claim 5, further comprising:
sending a request to read at least a portion of the state maintained in the distributed system to at least some of the plurality of nodes that comprise the distributed system in order to satisfy a hybrid quorum policy for reading the state maintained in the distributed system, wherein the hybrid quorum policy for reading the state comprises individual read quorum policies for the plurality of different quorum sets;
receiving a plurality of responses from different ones of the at least some nodes sent the read request, wherein the plurality of responses comprise respective versions of the portion of the state;
determining that the plurality of responses satisfy the hybrid quorum policy for reading the state maintained in the distributed system, wherein said determining comprises:
evaluating the plurality of responses with respect to the individual read quorum policies for the plurality of different quorum sets; and
in response to determining that the plurality of responses satisfy the hybrid quorum policy for reading the state, identifying a consistent version of the portion of the state to provide as the requested portion of the state based, at least in part, on the respective versions of the requested portion of the state.

9. The method of claim 5, further comprising:
detecting a modification event for the hybrid quorum policy;
in response to detecting the modification event:
modifying the hybrid quorum policy according to the modification event; and
storing a new hybrid policy version identifier corresponding to the modified hybrid quorum policy at a number of nodes including the one or more nodes such that an access request directed to a possible read quorum or a possible update quorum includes at least one of the number of nodes.

10. The method of claim 9, wherein modifying the hybrid quorum policy according to the modification event comprises removing the individual quorum policy for one or more of the plurality of different quorum sets from the hybrid quorum policy.

11. The method of claim 9, wherein modifying the hybrid quorum policy according to the modification event comprises adding an individual quorum policy for one or more of additional quorum sets.

12. The method of claim 5, wherein the plurality of different quorum sets comprise an original quorum set and a new quorum set, and wherein the update request is performed during a transition between the original quorum set and the new quorum set.

13. The method of claim 5, wherein the state maintained in the distributed system is a data, and wherein the distributed system is a distributed storage system.

14. A non-transitory, computer-readable storage medium, storing program instructions that when executed by one or more computing devices cause the one or more computing devices to implement:
sending a request to update a state maintained in a distributed system to different ones of a plurality of nodes that comprise the distributed system in order to satisfy a hybrid quorum policy for updating the state maintained in the distributed system, wherein the hybrid quorum policy comprises individual quorum policies for a plurality of different quorum sets, wherein each quorum set includes one or more nodes of the plurality of nodes such that a given node of the plurality of nodes is included in at least one quorum set of the plurality of quorum sets;
receiving a plurality of acknowledgments from at least some of the different nodes sent the request indicating that the update to the state is performed;
determining that the plurality of acknowledgements satisfy the hybrid quorum policy for updating the state maintained in the distributed system, wherein said determining comprises: evaluating the plurality of acknowledgments with respect to the individual quorum policies for the plurality of different quorum sets and with respect to an indication in the hybrid quorum policy of which individual quorum policies are to be satisfied; and
in response to determining that the plurality of acknowledgments satisfy the hybrid quorum policy, identifying the update to the state as durably performed.

15. The non-transitory, computer-readable storage medium of claim 14, wherein the one or more nodes included in at least one of the plurality of different quorum sets are located in a correlated failure zone.

16. The non-transitory, computer-readable storage medium of claim 14, wherein the program instructions further cause the one or more computing devices to implement:
sending a request to read at least a portion of the state maintained in the distributed system to at least some of the plurality of nodes that comprise the distributed system in order to satisfy a hybrid quorum policy for reading the state maintained in the distributed system, wherein the hybrid quorum policy for reading the state comprises individual read quorum policies for the plurality of different quorum sets;
receiving a plurality of responses from different ones of the at least some nodes sent the read request, wherein the plurality of responses comprise respective versions of the portion of the state;
determining that the plurality of responses satisfy the hybrid quorum policy for reading the state maintained in the distributed system, wherein said determining comprises:
evaluating the plurality of responses with respect to the individual read quorum policies for the plurality of different quorum sets; and
in response to determining that the plurality of responses satisfy the hybrid quorum policy for reading the state, identifying a consistent version of the portion of the state to provide as the requested portion of the state based, at least in part, on the respective versions of the requested portion of the state.

17. The non-transitory, computer-readable storage medium of claim 14, wherein the program instructions cause the one or more computing devices to further implement:

prior to sending the request to update the state maintained in the distributed system:

sending the request to update the state to one or more nodes of the plurality nodes, wherein the request includes a hybrid quorum policy version identifier for a particular hybrid quorum policy for updating the state;

receiving an error response from at least one of the one or more nodes indicating a new hybrid quorum policy version identifier; and obtaining a new hybrid quorum policy corresponding to the new hybrid quorum policy version identifier;

wherein the new hybrid quorum policy is the hybrid quorum policy for updating the state maintained in the distributed system.

18. The non-transitory, computer-readable storage medium of claim 17, wherein the program instructions further cause the one or more computing devices to implement:

detecting a modification event for the hybrid quorum policy;

in response to detecting the modification event:

modifying the hybrid quorum policy according to the modification event; and storing the new hybrid policy version identifier at a number of nodes including the one or more nodes such that a possible read quorum or a possible update quorum includes at least one of the number of nodes.

19. The non-transitory, computer-readable storage medium of claim 18, wherein in modifying the hybrid quorum policy according to the modification event, the program instructions cause the one or more computing devices to implement:

adding an individual quorum policy for one or more of additional quorum sets; or removing the individual quorum policy for one or more of the plurality of different quorum sets from the hybrid quorum policy.

20. The non-transitory, computer-readable storage medium of claim 14, wherein the distributed system is a distributed storage system, wherein the one or more computing devices together implement a client of the distributed storage system, and wherein the state is a data volume maintained for the client.

* * * * *